MAGNETIC TAPE STORAGE SYSTEM FOR DIGITAL COMPUTERS WHEREIN AN INDICATION OF THE NUMBER OF BITS IN A MESSAGE IS STORED WITH THE MESSAGE

Filed March 23, 1959 3 Sheets-Sheet 1

INVENTOR.
PAUL R. GILSON
BY
Christie, Parker & Hale
ATTORNEYS

July 14, 1964 P. R. GILSON 3,141,151

MAGNETIC TAPE STORAGE SYSTEM FOR DIGITAL COMPUTERS WHEREIN AN INDICATION OF THE NUMBER OF BITS IN A MESSAGE IS STORED WITH THE MESSAGE

Filed March 23, 1959 3 Sheets-Sheet 2

INVENTOR.
PAUL R. GILSON

BY Christie, Parker & Hale
ATTORNEYS

July 14, 1964 P. R. GILSON 3,141,151

MAGNETIC TAPE STORAGE SYSTEM FOR DIGITAL COMPUTERS WHEREIN AN INDICATION OF THE NUMBER OF BITS IN A MESSAGE IS STORED WITH THE MESSAGE

Filed March 23, 1959 3 Sheets-Sheet 3

INVENTOR.
PAUL R. GILSON
BY Christie, Parker & Hale
ATTORNEYS

United States Patent Office 3,141,151
Patented July 14, 1964

3,141,151

MAGNETIC TAPE STORAGE SYSTEM FOR DIGITAL COMPUTERS WHEREIN AN INDICATION OF THE NUMBER OF BITS IN A MESSAGE IS STORED WITH THE MESSAGE

Paul R. Gilson, West Covina, Calif., assignor to Burroughs Corporation, Detroit, Mich., a corporation of Michigan
Filed Mar. 23, 1959, Ser. No. 801,247
13 Claims. (Cl. 340—172.5)

Figure 1A:
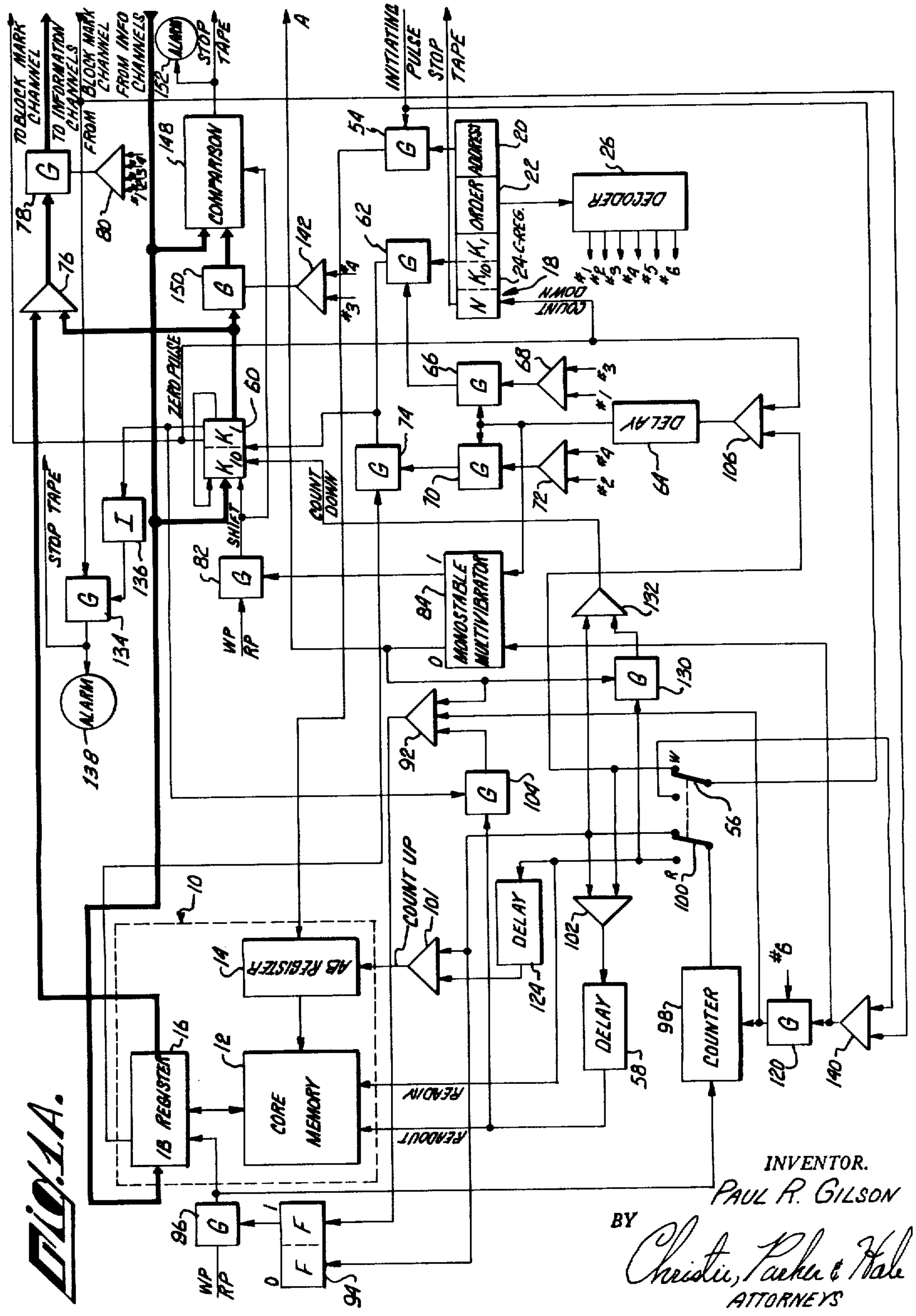

This invention relates to electronic digital processing equipment, and more particularly, is concerned with a magnetic tape storage system for a digital computer.

The use of magnetic tape to store digital information is well known. Digital information is usually stored in binary form magnetically on the tape. Magnetic tape has the advantage that large quantities of data can be stored in relatively small space, thus providing a convenient bulk storage means for operation with digital computers and the like.

It is the general practice to store digital information in blocks which can be addressed by the computer for reading out a selected group of information. Generally these blocks include a fixed number of words, each word including a fixed number of digits or characters. It is desirable to be able to rewrite selected blocks on the tape as required to selectively update information stored on the tape.

This has only been accomplished heretofore where blocks of fixed word lengths are used. In addition to overwriting selected blocks on tape, it is desirable in many instances to be able to vary the number of words in a block according to the particular problem at hand. This may be particularly important in commercial applications where it is desired that each block on tape contain the complete information regarding a particular account. The stored information may vary from account to account, making it desirable to have blocks of varying length.

The present invention provides a bulk tape storage system which includes selectively variable block length operation and which at the same time permits overwriting of any selected block or blocks for updating portions of the information stored on the tape.

This arrangement gives greater flexibility to the programmer in using the bulk storage in conjunction with a digital computer. It also permits reduced operating time since updating does not require rewriting of an entire tape. Also the variable block length permits more information to be stored on one tape since unused word spaces necessitated by fixed block lengths are avoided.

In brief, the advantages of the present invention are accomplished by an arrangement in which preface digits are always written at the beginning of each block of information recorded on tape. These preface digits indicate the number of words in the associated block. If all the blocks are to be of the same block length, the preface digits can be initially derived from the instruction word in the computer. However, if variable length blocks are to be recorded, the preface digits are initially derived from the quick-access memory of the computer along with the operand words to be stored on the tape.

During playback, preface digits are stored in a counter which is counted down as each word in the selected block is transferred to the quick-access memory of the computer. The counter provides a check to determine whether the correct number of words have been transferred from the block to the computer. The preface digits on the tape can be either dumped during readout or they can be transferred to the memory of the computer along with the operands read off of tape. Entering the preface digits in memory provides ready means for determining the number of words entered in the storage from the magnetic tape, the location in memory of the last word entered from tape, and precise mapping of a tape on which variable block lengths are used.

In overwriting, since variable block lengths are permitted on tape, it is necessary to know in advance the number of words in a particular block. This information is provided by the preface digits at the beginning of the block before overwriting. A comparison is made between the preface digits of the selected block on tape and the preface digits associated with the new block of information to be written on tape. The latter preface digits may be either derived from memory or from the instruction word, and comparison must take place before overwriting can be initiated. Comparison of the preface digits before initiating overwrite provides a check on the machine and the programmer, and also permits multiple block operation, i.e., overwriting a number of blocks in succession, where variable block lengths may occur.

Figure 1B:
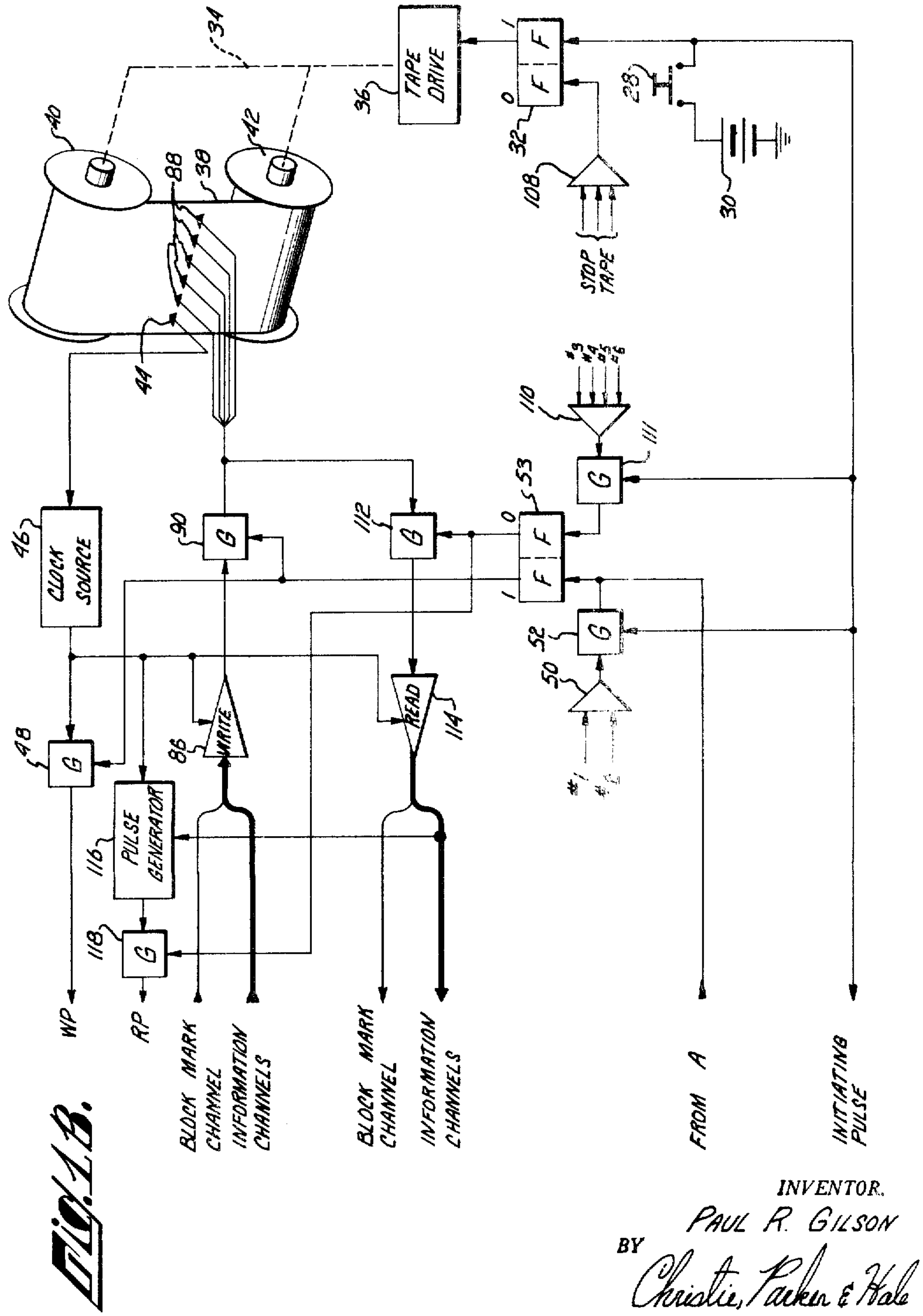
Figure 2:
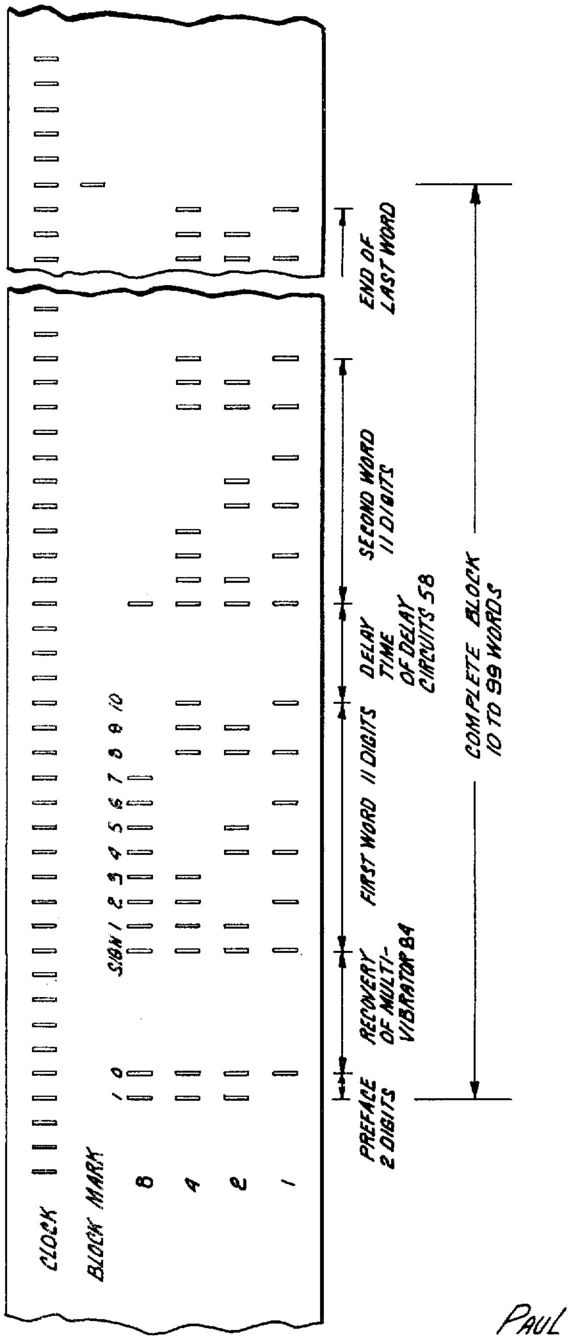

For a more complete understanding of the invention, reference should be had to the accompanying drawings, wherein:

FIGS. 1A and 1B show a block diagram of one embodiment of a bulk tape storage system in conjunction with a digital computer incorporating the features of the present invention; and FIG. 2 is a diagrammatic showing of a section of magnetic tape.

The embodiment hereinafter described in detail in connection with FIG. 1 is particularly adapted to be used with an internally programmed digital computer of the type described in copending application Serial No. 788,-823, filed January 26, 1959, now Patent No. 3,001,708, in the name of E. L. Glaser and Lloyd Cali and assigned to the assignee of the present invention. This particular digital computer is of serial type in which digits are transferred in time sequence. While information can be coded in any desired form in the registers of the computer it is assumed that information is represented in binary-coded decimal form, i.e., decimal digits are represented by four binary bits preferably according to a 1–2–4–8 code. All information is stored in the computer in the form of words, the standard word length being ten digits plus a sign digit. Words circulated in the computer are generally of two designated types, namely, operands and instructions. The instruction words have designated digits which represent the order to be executed, such as the order to read from magnetic tape into the computer. The instruction word also includes the address of word storage positions in the computer memory from which a word is to be read out or modified according to the order of the instruction.

With these general principles of operation in mind, reference may be had to the details in FIG. 1A where the numeral 10 indicates generally the memory portion of the computer in which instructions and operands are stored. The memory portion 10 is preferably of a random access magnetic core type such as described in detail in the book "Digital Computer Components and Circuits" by R. K. Richards, D. Van Nostrand Co., 1957, Chapter 8. The computer memory includes a core memory circuit 12 which comprises a coincidence core matrix circuit and suitable driver and sensing circuits. Associated with the core memory circuit 12 is an address buffer (AB) register 14 which may be also operated as a binary counter in response to applied counting input pulses. Also associated with the core matrix circuit 12 is an information buffer (IB) register 16 from which or to which words are transferred in parallel. The IB-register 16 includes eleven decades for temporarily storing one complete word, four bits, indicative of one decimal digit, being stored in each decade. Information bits can be transferred in parallel from the flip-flops of the eleven decades to a designated memory location or out of the designated memory locations in the core memory circuit 12 to the decades in the IB-register.

Instructions are normally fetched from the memory in a predetermined sequence and transferred to a command register, designated the C-register indicated generally at 18. The C-register 18 is divided up into an address portion 20 in which the address digits are stored, an order portion 22 in which digits indicative of the particular order to be executed are stored, and a variant portion 24 in which digits for special operations are stored. The manner in which instructions are fetched from memory and shifted into the C-register 18 forms no part of the present invention, and is described in detail in the above-identified copending application.

The C-register 18, like the IB-register 16, comprises a group of decades corresponding to the number of digits comprising an instruction word. Each decade stores the four binary bits indicative of a single decimal digit. According to the format of the instruction word, there are a group of, for example, four decimal digits stored in four decades comprising the address portion 20, two order digits stored in two decades comprising the order portion 22, and four variant digits stored in four decades comprising the variant portion 24. Two of the variant decades, designated $K_{10}$ and $K_1$ are used to store preface digits required in certain instructions involving transfer between the computer and magnetic tape. The preface digits represent the number of words in blocks on the tape. Another of the variant decades, designated N, is used to store a single digit representing the number of blocks to be transferred.

In the following discussion concerning the design and operation of the circuit shown in FIG. 1, it is assumed that a desired instruction has been transferred and stored in the C-register 18 at the start of operation. There are six instructions involving transfer of information between the computer and magnetic tape. These six instructions, each of which has its characteristic order digits for storage in the order portion 22, are called Initial Write, Initial Write Record, Overwrite, Overwrite Record, Tape Read, and Tape Read Record. The Initial Write instruction requires that operand words be transferred from the core memory to magnetic tape starting with the operand indicated by digits stored in the address portion 20 of the C-register 18. The length of the blocks written on tape are determined by the digits in the $K_{10}$ and $K_1$ decades of the variant portion 24, while the number of blocks transferred to the tape may be from 1 to 9 as determined by the digit stored in the N decade of the variant portion 24. This instruction also requires that the preface digits be recorded at the start of each block. It will be noted that all the blocks transferred must be of the same length as determined by the preface digits $K_{10}$ and $K_1$ of the instruction.

The Initial Write Record instruction is substantially the same as the Initial Write instruction except that the preface digits are derived from memory rather than from the variant portion 24 of the C-register. Thus this instruction permits each block to be of a different length.

In the Tape Read instruction, a block is read from tape into the core memory, the first word in the block being read into the address location determined by the digits stored in the address portion 20 of the C-register. The Tape Read Record instruction is substantially the same except that the preface digits at the start of each block are also transferred to the core memory.

The Overwrite instruction provides for overwriting on a selected block or group of blocks on tape, the first word in the core memory being derived from the address location determined by the digit stored in the address portion 20 in the C-register 18.

The preface digits are part of the instruction and are stored in the $K_{10}$ and $K_1$ decades. However, for the Overwrite Record instruction the preface digits are stored in memory and may be different for each of the blocks in the group of blocks being overwritten.

The order digits in the order portion of the C-register 18 are applied to a decoder circuit 26, which may be a conventional diode matrix circuit for converting from binary to the decimal form. See for example the above-mentioned book by R. K. Richards, pages 56–60. The decoder produces a high level on one of six output lines in response to one of different six orders, corresponding to one of the six instructions outlined above. Assuming that the instruction calls for Initial Write, the #1 output line from the decoder 26 is raised to a high potential level. This level is used throughout the circuit as hereinafter described to establish the proper operation of the circuit to accomplish the Initial Write operation. Similarly if the instruction calls for Initial Write Record, the #2 output line from the decoder 26 is raised to a high potential level.

Operation of the tape unit is initiated by a switch 28 (see FIG. 1B). While the switch is shown as a manually operated push-button switch, it will be understood that this switch can be automatically controlled by the computer for a completely automatic computer operation. Closing of the switch 28 momentarily connects a potential from a battery 30, generating an initiating pulse which sets a flip-flop 32. The flip-flop 32 in turn controls the drive 36 for a magnetic tape transport indicated schematically at 34. The tape transport is conventional in form, the drive mechanism 36 providing means for driving magnetic tape, indicated at 38, from a supply reel 40 to a takeup reel 42.

As shown in FIG. 2, the tape 38 is preferably arranged to have six channels on which binary bits are recorded. The first four channels provide the parallel storing of the four bits necessary for coding each of the decimal digits. The fifth channel stores bits indicating the end of blocks of information while the sixth channel stores timing pulses for synchronizing the writing of information on the tape. It is assumed that initially only the timing pulses are recorded on the tape during its editing operation.

A magnetic head 44 reads out the timing pulses into a clock generator 46 which may be a blocking oscillator by means of which sharp pulses are provided in response to the pulses read out of the timing track on the magnetic tape. The output of the clock generator 46 is coupled to a gate 48 which is biased open during the Initial Write instruction and the Initial Write Record instruction. To this end, the #1 and #2 lines from the decoder 26 are applied to an OR circuit 50, the output of which is applied to a gate 52, together with the initiating pulse to set a flip-flop 53. The flip-flop 53 opens the gate 48, passing pulses designated WP, or write pulses, and so indicated throughout the circuit of FIG. 1 where used.

In both the Initial Write instruction and the Initial Write Record instruction, the first word from memory to be transferred to tape must first be read out from the designated address location. To this end the digits stored in the address portion 20 of the C-register are transferred by means of a gating circuit 54 to the AB-register 14. The transfer is accomplished by the initial pulse generated on the closing of the pushbutton switch 28 which is applied to the gating circuit 54.

This same initial pulse is also applied through a single-pole double throw switch 56 which is manually settable for either reading or writing on magnetic tape. The switch 56 is shown in the Write position W in the circuit of FIG. 1 as it is set for Initial Write or Initial Write Record instruction. While the switch 56 is shown as manually operated, it may be an electronic switch controlled by the computer if desired. With the switch 56 in the Write position W, the initial pulse is connected through a delay circuit 58 to the Readout input of the core memory 12. Pulsing the Readout input causes the addressed word in memory to be transferred to the IB-register 16. The delay circuit 58 provides sufficient delay time to permit the setting of the flip-flops in the AB-register 14 before pulsing the core memory 12.

With the Initial Write order, the word transferred to the IB-register 16 is an operand whereas with the Initial Write Record order, the word transferred is the preface word and contains two digits in the most significant digit positions of the word, the $K_{10}$ and the $K_1$ digits which together designate the number of words in the block. The number of words may vary according to the value of the preface digits anywhere from a minimum of ten to a maximum of ninety-nine.

Assuming for the moment that an Initial Write order is called for, preface digits are not derived from the core memory 12 but are derived from the $K_{10}$ and $K_1$ decades of the variant portion 24 in the C-register. These digits are transferred into a two-decade register, designated register 60, through a gating circuit 62. The transfer is effected by means of the initial pulse generated by the closing of the switch 28 as passed by the switch 56 in its Write position. The pulse is delayed by delay circuit 64 which provides a delay slightly in excess of the time required for the initial pulse to establish the first word in the IB-register 16. The delayed pulse is applied to the gate 62 through a gate 66 which is biased open by the #1 line from the decoder 26 through an OR circuit 68. Thus during the Initial Write instruction, the initial pulse produces a transfer of the preface digits from the C-register to register 60 from which the preface digits are transferred to the magnetic tape as hereinafter described.

If an Initial Write Record instruction has been called for, the preface digits are transferred to register 60 from the IB-register 16 in a similar manner. To this end the delayed initial pulse as derived from the delay circuit 64 is applied to a gate 70 which is biased open in response to the #2 line from the decoder 26 through an OR circuit 72. The delayed initial pulse passed by the gate 70 is applied to a gating circuit 74 which couples the decades storing the preface digits in the IB-register 16 to the decades of register 60 in parallel. Thus with the Initial Write Record command, the preface digits are transferred from the IB-register 16 to register 60.

Once the preface digits are transferred to the register 60, operation for both the Initial Write instruction and the Initial Write Record instruction is the same. Writing of the preface digits from register 60 and operands from the IB-register 16 in serial to the magnetic tape is accomplished by connecting these respective registers through an OR circuit 76 to a gating circuit 78. The latter is biased open during both the Initial Write instruction and the Initial Write Record instruction by connecting the #1 and #2 lines from the decoder 26 through an OR circuit 80 to the gate 78.

The shifting out of the preface digits from register 60 is accomplished by coupling WP's to the shift input of register 60 through a gate 82 controlled by a monostable multivibrator 84. The monostable multivibrator is triggered by the delayed initial pulse derived from the delay circuit 64 and has a recovery time sufficiently long to hold the gate 82 open two clock pulse times whereby two shifting pulses are applied to register 60. This shifts the $K_1$ and $K_{10}$ digits serially out of register 60 through the open gate 78 to a Write amplifier 86. The amplifier 86 is conventional in form and is provided with five channels of amplification, four for the four parallel bits transferred for each digit to be written on tape, and the fifth channel for writing end-of-block markers in the fifth channel on the tape. The amplifier 86 may be strobed in conventional fashion by clock pulses from the generator 46 so that the actual writing on tape is synchronized with the clock pulses on the sixth channel of the tape. The output of the amplifier 86 is applied to a five-channel magnetic transducer head 88 through a gating circuit 90. The latter is biased open during the Initial Write and Initial Write Record instructions by the set flip-flop 53.

Thus it will be seen that after a delay interval controlled by the delay circuit 64 following the momentary closing of the pushbutton switch 28, preface digits are recorded on the magnetic tape derived either from the C-register 18 or the core memory 12. In either event, the preface digits designate the number of words to be subsequently recorded in a block on the magnetic tape 38.

Assuming an Initial Write order again, the first operand word to be stored on the tape is already stored in the IB-register 16. When the monostable multivibrator 84 returns to its stable operating condition, it produces a pulse which is applied through an OR circuit 92 to set a flip-flop 94 which in turn opens a gate 96 through which shifting pulses are applied to the IB-register 16. The flip-flop 94 is thus set to bias open the gate 96, passing WP pulses to the shifting input of the IB-register. The next eleven clock pulses shift out the eleven digits from the IB-register 16 through the OR circuit 76, to the Write amplifier 86 and onto the tape 38.

The same eleven pulses are applied to a counter 98 which is arranged to produce an overflow pulse following eleven input pulses applied thereto. The overflow output from the counter 98 is connected to a single-pole double throw switch 100 which is set to either a Read or Write position, it being shown in the Write position W in FIG. 1A. Switches 56 and 100 may be linked, as indicated by the dash line in FIG. 1A, to operate together. The overflow pulse, with the switch 100 in the Write position W, is applied to the flip-flop 94 for resetting the flip-flop and closing the gate 96, thus preventing further shifting of the IB-register 16.

The overflow pulse is also applied to the counting input of the AB-register 14 through an OR circuit 101, advancing it to the next consecutive count condition and establishing the next address location in memory. The overflow pulse is also applied through an OR circuit 102 to the Readout input of the core memory 12 through the delay circuit 58, thus causing the word in the next consecutive address location to be transferred to the IB-register 16. The output of the delay circuit 58 is also applied through a gate 104 to the OR circuit 92 for setting the flip-flop 94 and again opening the gate 96. Thus after a delay interval determined by the delay circuit 58, the next word from the core memory 12 is now shifted by WP pulses out of the IB-register 16 to the tape 38.

The overflow pulse from the counter 98 is also used to count down register 60, which for this purpose is arranged as a binary counter. It should also be noted that register 60 has a recirculation path so that the preface digits are retained in the register 60 at the same time the preface digits are shifted to the magnetic tape. The preface digits are thereby retained in register 60. Thus it will be seen that as each word is transferred to the tape, the counter 98 counts register 60 down and after the desired number of words to complete one block have been transferred to tape, register 60 will be counted down to zero. The register 60 controls the gate 104 such that when register 60 is returned to the zero condition, the gate 104 is closed, preventing further setting of the flip-flop 94 by pulses from the delay circuit 58. Further shifting of the IB-register 16 is thereby halted after a complete block of a required number of words established by the preface digits has been transferred to the tape.

The register 60 is also arranged to produce an output pulse when it is counted down to zero. This pulse is used to record an end-of-block mark in the fifth channel of the magnetic tape, by coupling the pulse to the fifth channel of the Write amplifier 86.

As noted above, the number of blocks to be initially written may be any number from 1 to 9 as determined by the digit stored in the N-decade of the variant portion 24 of the C-register. This decade is arranged as a counter. The overflow pulse produced when register 60 is counted down to zero is used to count down the N-decade to keep track of the number of blocks transferred to tape. The same overflow pulse is also applied through an OR circuit 106 to the delay circuit 64, thus initiating another block operation, which proceeds in the same manner as described above. In this manner, successive blocks are transferred from the core memory 12 together with the preface digits derived either from the $K_{10}$ and $K_1$ decades of the variant portion 24 in the C-register for the Initial Write instruction, or from the core memory 12 for the Initial Write Record instruction. When the required number of blocks has been transferred to the tape, the N-decade of the variant portion 24 of the C-register is counted down to zero, producing an overflow pulse which is applied to the flip-flop 32 through an OR circuit 108. This restores the flip-flop 32 to its initial state, turning off the drive 36 and stopping the tape storage operation.

To read out a block of information from the magnetic tape into the memory 10 of the computer, it is first necessary to position the magnetic tape in relation to the transducer head 88 so that reading will take place from the start of the desired block. The manner in which the tape is positioned to read out information to the computer forms no part of the present invention. This is a separately programmed operation of the computer and may be accomplished in a number of different ways which are well known in the operation of magnetic tape for use in a bulk digital storage device. For example, address words may be provided associated with each block and the magnetic tape scanned for the address words, the tape being stopped in position when the desired address word is located. For the present invention, it is assumed that the tape is properly positioned to provide readout from the start of the selected block.

With a Tape Read instruction or a Tape Read Record instruction stored in the C-register, either the #5 line or the #6 line from the decoder 26 will be energized. Readout is initiated by pressing the button 28, thereby generating an initiating pulse which again sets the flip-flop 32 to actuate the drive 36. The #5 and #6 lines from the decoder 26 are applied to an OR circuit 110, the output of which is used to bias open a gate 111 which passes the initiating pulse to reset the flip-flop 53. This opens a gate 112 connecting the transducer head 88 to the input of a Read amplifier 114. The Read amplifier may be strobed by clock pulses from the generator 46 to synchronize the output with the clock pulses. The output of the Read amplifier 114 is applied to a pulse generator circuit 116 connected to the output of the clock generator 46. The pulse generator 116 is arranged to gate clock pulses to the output whenever a pulse is sensed in any of the four information channels of the Read amplifier output. It should be noted that by recording binary information bits on the tape in the form of flux changes for indicating a binary zero and the absence of flux changes for indicating a binary one, zero digits stored as part of a word produce an output pulse from the generator 116 whereas blank spaces between the words result in no output pulses from the generator 116. Since no pulse in all four channels corresponds to a forbidden combination, namely, the binary representation of the decimal number 16, there is no confusion between blank spaces and significant digits stored as words in the tape.

The output of the pulse generator 116 is applied to a gate 118 which is normally biased open by the reset flip-flop 53 during the Tape Read and the Tape Read Record instructions. The output pulses from the gate 118 are designated as RP, or read pulses, which are used throughout the circuit of FIG. 1A as indicated.

For reading out from magnetic tape, the switches 56 and 100 are set to the Read position R. The initiating pulse produced by closing of the switch 28 opens the gate 54 to provide the initial address of the core memory 12 to which the first operand word or the preface digits will be directed from the magnetic tape. The initiating pulse also sets the monostable multivibrator 84 to open the gate 82.

As the preface digits are read out of the tape through the amplifier 114, two RP's are generated at the output of the gate 118. These are applied to register 60 through the gate 82. The output of the read amplifier 114 is coupled to the input of register 60. Thus the two RP's shift the two preface digits into register 60.

If the Tape Read Record instruction is called for, requiring the preface digits to be transferred to the core memory 12, the #6 line connected to gate 120 opens the gate and passes the initial pulse. The output of the gate 120 is used to set the counter 98 to its count 9 condition. The initiating pulse passed by the gate 120 is also applied through the OR circuit 92 to set the flip-flop 94 thereby opening the gate 96 and permitting the initial RP's to shift the preface digits from the read amplifier 114 into the IB-register 16.

The same RP's actuate the counter 98 producing an overflow pulse after two pulses, since the counter is initially set to 9. The overflow pulse is applied to the Readin input of the core memory 12 through the switch 100, causing the preface digits to be transferred from the IB-register 16 into the designated address location in the core memory 12. The overflow pulse from the counter 98, as passed by the switch 100 in its Read position R, is delayed by a delay circuit 124 and applied to the counting input of the AB-register 14 through the OR circuit 101 for advancing the register 14 to the next count condition corresponding to the next consecutive address location in the core memory 12.

In the event of a Tape Read instruction, of course, the gate 120 is not open, so that the preface digits are not transferred from the IB-register 16 to the core memory. For either instruction, as the first word following the preface digits is read off the tape, it is shifted into the IB-register 16. This is effected by a pulse generated by the monostable multivibrator 84 when it returns to its stable state. This pulse passed by the OR circuit 92 sets the flip-flop 94, opening the gate 96. The overflow pulse produced by the counter 98 causes the word shifted into the IB-register to be transferred to the core memory, in the same manner as described above in connection with the transfer of preface digits to memory for the Tape Read Record instruction. Words continue to be transferred into the IB-register 16 in the same manner by RP pulses.

Overflow pulses from the counter 98 during the read operation are applied to a gate 130 which is controlled by the monostable multivibrator 84. Thus the gate 130 is not biased open until the monostable multivibrator 84 returns to its stable condition. This prevents the overflow pulse from the counter 98 following the writing of the preface digits into the core memory 12 from being passed by the gate 130. However, the overflow pulses generated following the writing in of each of the complete operand words from the tape produces an output at the gate 130 which is coupled through an OR circuit 132 to the countdown input of register 60. Thus the register 60 should be returned to a count of zero after all of the words in the block on the magnetic tape have been transferred to the core memory.

As a check, the block mark in the fifth channel of the tape is transferred from the output of the Read amplifier 114 to a gate 134 controlled by register 60 through an inverter 136. In this manner, when register 60 is returned to zero, the gate 134 is biased closed so as to *inhibit* transfer of the block mark. However, if register 60 is not at zero, the block mark will be passed by the gate 134 to actuate an alarm 138 and also to reset the flip-flop 32 through the OR circuit 108 to stop the tape drive.

If it is desired that several blocks be read out, the appropriate number of blocks is established in the N decade of the format portion 24 in the C-register. The tape continues to run until the N decade is counted back to zero in the same manner as with the Initial Write instruction, at which time the carry pulse from the N decade resets the flip-flop 32 through the OR circuit 108. Block mark pulses from the fifth channel of the read amplifier 114 are applied through an OR circuit 140 connected also to the R terminal of the switch 56, whereby readout of the next block is initiated in the same way that the initial pulse from the switch 28 started the Read operation as described above.

For the Overwrite and the Overwrite Record instructions, the #3 or #4 lines respectively from the decoder 26 are raised to a high level by the appropriate order digits stored in the order portion 22 in the C-register. As in the Tape Read operation, the magnetic tape must first be positioned at the start of a selected block which is to be overwritten. Assuming this has taken place, the pushbutton switch 28 is actuated, setting the flip-flop 32 and starting the tape drive 36. The switches 56 and 100 are set in the Write position and operation is initiated by the switch 28 in exactly the same way as for the Initial Write and Initial Write Record instructions respectively. The #3 and #4 lines from the decoder 26 are respectively applied to the OR circuits 68 and 72 to control respectively the gates 66 and 70 for transferring preface digits to register 60 either from the $K_{10}$ and $K_1$ decades or memory.

The Overwrite operation requires that the preface digits already recorded on tape at the beginning of the block be initially read out and compared with the preface digits stored either in the $K_{10}$ and $K_1$ decades of the variant portion 24 in the C-register, or with the preface digits read out of the core memory into the IB-register 16 depending upon whether an Overwrite instruction or an Overwrite Record instruction is called for. To this end, the #3 and #4 lines from the decoder 26 are applied to the OR circuit 110, the output of which resets the flip-flop 53. With the flip-flop 53 reset, it biases open the gate 112, thus permitting the preface digits to be read out of the tape. The preface digits are transferred from the output of the Read amplifier 114 to one input of a comparison circuit 148 at the same time the preface digits in register 60 are shifted out by the RP pulses passed by the gate 82. The preface digits from register 60 are transferred through a gate 150 which is biased open by the output of an OR circuit 142 to which the #3 and #4 lines are applied. The comparison circuit 148 is a conventional type of circuit which includes, for example, a pair of two-digit registers for respectively storing the preface digits from the tape and the preface digits from register 60 and logic circuitry for sensing if the flip-flops in the decades of the two registers are in identical condition, which obtains if the two sets of preface digits are identical. If there is a failure of comparison, the comparison circuit 148 produces an output signal which actuates an alarm 152 and also resets the flip-flop 32 to stop the drive 36. Otherwise operation is identical to the Initial Write and Initial Write Record operations. When the monostable multivibrator 84 returns to its stable condition following the transfer of the preface digits, it sets the flip-flop 53, biasing open the gate 90 and permitting the digits shifted out of the IB-register 16 to be written on the tape.

From the above detailed description of one embodiment of the invention, it will be appreciated that a system is provided whereby information may be transferred to magnetic tape from the memory of a digital computer in blocks of variable length. The preface digits recorded on tape provide a means for keeping track of block lengths for checking during Tape Read and for controlling the Overwrite operation.

What is claimed is:

1. A magnetic tape storage system for a digital computer in which words are transferred serially to and from the magnetic tape in blocks, comprising an addressable memory for storing a plurality of words, means for storing at least one preface digit indicative of the number of words in a block to be recorded on the magnetic tape, means synchronized with movement of the magnetic tape for transferring words in successive address locations in the memory to the magnetic tape including means for initially transferring the preface digit from said preface digit storing means to the magnetic tape, whereby a block recorded on tape is preceded by at least one preface digit indicating the number of words in the block, means for counting the number of words transferred from memory to the tape, and means responsive to the counting means and preface digit storing means for indicating when the required number of words for a complete block are transferred to the magnetic tape.

2. Apparatus as defined in claim 1 wherein at least one preface digit is initially stored in the addressable memory and further including means for initially transferring the preface digit from memory to the preface digit storing means.

3. Apparatus as defined in claim 2 for transferring a succession of blocks of different word lengths from memory to the magnetic tape further including means responsive to said indicating means for transferring at least one other preface digit from memory to said preface digit storing means at the completion of the previous block transfer to magnetic tape.

4. Apparatus comprising a digital storage memory device for storing individual words in addressable memory locations, a tape storage device for storing blocks of words on magnetic tape, means for transferring blocks of words between the memory device and the tape storage device including means for storing at least one preface digit indicating the number of words in a block to be transferred, means for recording at least one preface digit on the tape in association with each block of words recorded on the tape, and means for comparing the stored preface digit with the recorded preface digit during the transfer of a particular block of words between the memory device and the tape storage device and for providing an indication of the relative magnitude of the stored and recorded preface digits.

5. Apparatus for transferring blocks of digital information from a digital computer to magnetic tape comprising means for storing at least one digit identifying the length of the block to be transferred, means for initially reading off at least one digit from the tape indicative of the length of the associated block on the tape, means for comparing the value of the stored digit with the digit read off the tape, and means controlled by the comparing means for transferring the particular block from the computer to the tape if the comparison means indicates that the value of the digit read off the tape is at least as large as the value of the stored digit.

6. Apparatus for rewriting digital information in blocks of varying numbers of words on magnetic tape from a quick access memory comprising means for initially transferring at least one preface digit from memory identifying the number of words in a particular block on tape, means for temporarily storing the preface digit from memory, means for reading out at least one preface digit from the magnetic tape indicating the number of words in a selected block on tape to be rewritten, means for comparing the stored preface digit from memory with the preface digit read off the tape, and means for indicating if the value of the recorded digit read off the tape is smaller than the value of the stored preface digit.

7. A magnetic tape system for a digital computer in which words are stored in blocks on the tape comprising means for initially writing digital information on magnetic tape including means for writing at least one preface digit at the start of each block identifying the number of words in the block, means for reading information from the tape including means for comparing the preface digit with the number of words read out in the associated block and indicating a failure of comparison, and means for overwriting information in selected blocks, each block of information to be overwritten having at least one preface digit associated therewith identifying the number of words in the overwriting block, means for comparing the preface digit on the selected block on tape with the preface digit of the overwriting information and indicating a failure of comparison, and means for inhibiting the overwriting on tape when the comparison means indicates a failure in comparison.

8. A magnetic tape system comprising a magnetic tape for storing words of digital information in blocks of variable length, each of said blocks including at least one preface digit indicative of the length thereof, an addressable memory for storing words of information read from said tape, reading means coupled for selectively reading the words and preface digit from said tape and connected to be responsive to an applied input signal for ceasing to read same, counting means coupled to be set into an initial state in response to the preface digit read from said tape and coupled to be responsive to the words of the corresponding blocks read from said tape for counting and operative to apply an input signal to said reading means after a block is read from sad tape for thereby stopping the reading from tape, and means for writing the words read from said tape into said memory.

9. A storage system for a digital processing unit in which words are transferred serially to and from an auxiliary storage device in blocks, comprising an addressable memory for storing at least one word, means for storing preface digit indicative of the number of words in a block to be stored in the auxiliary storage device, means for transferring words in successive address locations in the memory to the auxiliary storage device including means for initially transferring the preface digit from said preface digit storing means to the auxiliary storage device whereby a block stored in the auxiliary storage device is preceded by at least one preface digit indicating the number of words in the block, means for counting the number of words transferred from memory to the auxiliary storage device, and means responsive to the counting means and preface digit storing means for indicating when the required number of words for a complete block are transferred to the auxiliary storage device.

10. Apparatus comprising a digital memory device for storing individual words in addressable memory locations, an auxiliary storage device for storing blocks of words, means for transferring blocks of words between the memory device and the auxiliary storage device including storage means for storing at least one preface digit indicating the number of words in a block to be transferred, means for storing at least one preface digit in the auxiliary storage device in association with each block of words stored therein, and means for comparing the preface digit stored in the preface digit storage means with the preface digit in association with a block of words during the transfer of such block of words between the memory device and the auxiliary storage device, and means for providing an indication of the relative magnitude of the preface digit contained in the preface digit storage means and such preface digit in association with a block of words.

11. Apparatus for transferring blocks of digital information from a processing device to auxiliary storage means comprising means for storing at least one digit identifying the length of a block to be transferred, means for initially reading at least one digit from the auxiliary storage means indicative of the length of the associated block in the auxiliary storage means into which a block of information is to be stored, means for comparing the value of the stored digit with the digit read from the auxiliary storage means, and means controlled by the comparing means for transferring the particular block from the processing device to the auxiliary storage means if the comparing means indicates that the value of the digit read from the auxiliary storage means is at least as large as the value of the stored digit.

12. Apparatus for restoring digital information in blocks of varying numbers of words in a storage device from a quick access memory comprising means for initially transferring at least one preface digit from memory identifying the number of words in a particular block, means for temporarily storing the preface digit from memory, means for reading out at least one preface digit from the storage device indicating the number of words in a selected block in the storage means which is to be restored with a block of words, means for comparing the stored preface digit from memory with the preface digit read from the storage device, and means for indicating if the value of the digit read from the storage device is smaller than the value of the stored preface digit.

13. An auxiliary storage device for a processing device in which words are stored in blocks in the auxiliary storage device comprising means for initially storing digital information in the auxiliary storage device, including means for storing at least one preface digit in association with each block identifying the number of words in the block, means for reading information and the preface digit from the auxiliary storage device including means for comparing a preface digit with the number of words read out in the associated block for indicating a failure of comparison, and means for restoring information in selected blocks, each block of information to be restored having at least one preface digit associated therewith identifying the number of words in the block, means for comparing the preface digit in the selected block in the auxiliary storage device with the preface digit of the information being restored and for indicating a failure of comparison, and means for inhibiting the restoring in the auxiliary storage device if the comparison means indicates a failure in comparison.

References Cited in the file of this patent

UNITED STATES PATENTS

| | | |
|---|---|---|
| 2,863,137 | Cox et al. | Dec. 2, 1958 |
| 2,907,004 | Chien et al. | Sept. 29, 1959 |
| 2,910,668 | Shaw | Oct. 27, 1959 |
| 2,992,413 | Adams et al. | July 11, 1961 |
| 3,012,227 | Astrahan et al. | Dec. 5, 1961 |

OTHER REFERENCES

IBM Reference Manual RAMAC 305, International Business Machines Corp., Data Processing Div., copyright 1958, and with minor revision, 1959.